US012640668B2

(12) United States Patent
Andrich

(10) Patent No.: US 12,640,668 B2
(45) Date of Patent: May 26, 2026

(54) PHASE ADVANCE METHOD IN MOTORS WITH PERMANENT MAGNETS PRESENTING INDUCED VOLTAGES WITH FLAT REGION

(71) Applicant: NIDEC GLOBAL APPLIANCE BRASIL LTDA, Joinville (BR)

(72) Inventor: Roberto Andrich, Joinville (BR)

(73) Assignee: NIDEC GLOBAL APPLIANCE BRASIL LTDA., Joinville SC (BR)

( * ) Notice: Subject to any disclaimer, the term of this patent is extended or adjusted under 35 U.S.C. 154(b) by 90 days.

(21) Appl. No.: 18/033,781

(22) PCT Filed: Oct. 26, 2021

(86) PCT No.: PCT/BR2021/050468
§ 371 (c)(1),
(2) Date: Apr. 25, 2023

(87) PCT Pub. No.: WO2022/087701
PCT Pub. Date: May 5, 2022

(65) Prior Publication Data
US 2023/0396193 A1 Dec. 7, 2023

(30) Foreign Application Priority Data
Oct. 26, 2020 (BR) ...................... 10 2020 021916 2

(51) Int. Cl.
H02P 6/18 (2016.01)
H02P 6/17 (2016.01)
(52) U.S. Cl.
CPC ................ H02P 6/186 (2013.01); H02P 6/17 (2016.02)

(58) Field of Classification Search
CPC .................................. H02P 6/186; H02P 6/17
USPC ...................................................... 318/400.32
See application file for complete search history.

(56) References Cited

U.S. PATENT DOCUMENTS

| | | | |
|---|---|---|---|
| 6,512,341 B2 | 1/2003 | Matsushiro et al. | |
| 6,922,027 B2 | 7/2005 | Schwarz et al. | |
| 2007/0229004 A1* | 10/2007 | Fukamizu ............... | H02P 6/182 |
| | | | 318/400.11 |

(Continued)

FOREIGN PATENT DOCUMENTS

WO WO-2005/025050 A1 3/2005

OTHER PUBLICATIONS

Harke, Markus, "Modeling of Interior Permanent Magnet Synchronous Motors in the Six-Step Conduction Mode," 2014 International Conference on Electrical Machines [ICEM], IEEE, Sep. 2, 2014, p. 227-233, XP032687691.

(Continued)

*Primary Examiner* — Kawing Chan
(74) *Attorney, Agent, or Firm* — Foley & Lardner LLP

(57) ABSTRACT

The present invention refers to the use of phase advance in motors with non-ideal induced voltages, especially in motors with induced voltages that present a flat region, to avoid instability in the control, wherein the first step is to detect the passage of the voltage induced by the flat region of instability, and then apply a fixed increment in the phase advance in order to avoid the flat region. Detection can be done in two ways: by direct measurement of induced voltage; and measuring the extinguishing time of the freewheel current.

3 Claims, 7 Drawing Sheets

(56)                    References Cited

U.S. PATENT DOCUMENTS

| | | | |
|---|---|---|---|
| 2014/0265967 A1* | 9/2014 | Brown | H02P 6/10 |
| | | | 318/400.27 |
| 2018/0183368 A1* | 6/2018 | Murakami | H02P 6/185 |
| 2019/0013750 A1* | 1/2019 | Leman | H02P 6/182 |

OTHER PUBLICATIONS

International Search Report dated Apr. 7, 2022 issued in International Application No. PCT/BR2021/050468, 4 pages.
Written Opinion dated Apr. 7, 2022 issued in International Application No. PCT/BR2021/050468, 8 pages.

* cited by examiner

PHASE ADVANCE METHOD IN MOTORS WITH PERMANENT MAGNETS PRESENTING INDUCED VOLTAGES WITH FLAT REGION

CROSS REFERENCE TO RELATED APPLICATIONS

This application is a national stage entry of PCT Application No. PCT/BR2021/050468, filed on Oct. 26, 2021, which claims priority to Brazilian Application No. 10 2020 021916 2, filed on Oct. 26, 2020, the contents of all of which are incorporated herein by reference in their entireties.

TECHNICAL FIELD

The present invention refers to techniques that allow increased rotation in brushless direct current (BLDC) motors with non-trapezoidal induced voltages and especially presenting a flat region of voltage near the zero-crossing point.

The flat region around zero-crossing causes instabilities in the monitoring of phase advance, due to the nonlinear and unpredictable effects in the zero-crossing region of the induced voltage.

BACKGROUND OF THE INVENTION

The typical sensorless drive of a BLDC motor compressor is the drive known as "six steps", where the motor drive is divided into six electrical positions, i.e., three phases (A, B and C).

In this sense, two of the phases are commanded in each position, while the third phase is used for monitoring the induced voltage and the consequent identification of the motor position.

The inverter consists of a converter stage at the input, responsible for providing a DC voltage source (Vbus). The input converter stage can be, for example, an AC-DC converter connected to the electricity grid, or even a DC-DC converter connected to a battery.

Additionally, there is an inverter bridge formed by six SW keys (1,2,3,4,5,6) connected to the converter output, wherein this inverter bridge is connected to the BLDC motor.

A control unit is formed by a voltage observer circuit, used to monitor the induced voltages and estimate the electrical angle of the rotor to then apply the various electrical positions (1, 2, 3, 4, 5, 6), divided into 60 degrees.

The most used rotor angle estimation technique in BLDC motors is to detect zero crossing of the induced voltage in the open phase during each position.

For example, assuming that phase A is completely open in position 6 and its induced voltage can be monitored, when the voltage at this stage reaches Vbus/2, it means that zero crossing has occurred. This crossing occurs at exactly 30 degrees from the switching point to position 1.

Therefore, it waits for the time corresponding to 30 degrees based on the previous switches and switches to position 1.

In general, each drive position is applied in phase with the induced voltages to ensure maximum torque and power factor. That is, the phase angle (AF) between the applied voltages of the inverter and the induced voltages of the motor is approximately null.

The induced voltages of the motor Ea, Eb and Ec (induced voltages in phases A, B and C, respectively) are proportional to the speed. Therefore, as the motor speed increases, these voltages approach the maximum value of the bus voltage (Vbus).

When the induced phase voltages (Eab, Ebc, Eca) reach the same amplitude as the voltage Vbus, it is no longer possible to inject current into the motor. At this point, it is not possible to accelerate the engine further without changing the control strategy.

The document WO 2005/025050 A1, entitled "Driving method and driving apparatus of permanent magnet synchronous motor for extending flux weakening region", published on Sep. 17, 2003, proposes two solutions to increase the rotation beyond the nominal level of a BLDC motor.

The first of them is to increase the level of conduction of each phase from 120 degrees to 150 degrees. In this way, the average voltage applied to the motor increases significantly and, in this way, higher speeds are reached. The driving angle is increased up to 150 degrees, because that is when the zero crossing takes place. Thus, when zero is detected, voltage is already applied to the phase. However, it is not possible to increase the conduction angle beyond 150 degrees, as in that case it would not be possible to detect the zero crossing.

Another solution detailed in the document is the open loop motor drive, that is, without the use of position estimation. In this way, the driving angle is extended up to 180 degrees and it is possible to further increase the average voltage applied to the motor, consequently increasing its rotation. However, this technique is limited by the fact that the angle between the applied voltage and the induced voltage (load angle) cannot be greater than 90 degrees (for a BLDC motor with equal direct axis and quadrature axis impedances), otherwise synchronism is lost, and control enters an unstable region that can lead to tipping.

In this sense, there is another technique described in the literature named phase advance. This technique consists of advancing the commutation angle of the applied voltage in relation to the rotor position. Thus, voltage is applied to the motor when the induced voltages Ea, Eb, Ec have not yet reached their maximum values for a given rotation. With this, it is possible to inject current into the motor and extend the maximum speed range for the same voltage value of the Vbus.

However, the techniques mentioned so far take into account the use of BLDC motors with perfectly trapezoidal voltages. In this case, the zero-crossing point (Z) of the induced voltages is well defined.

In practice, however, for reasons of cost and simplification of production processes it is not always possible to design an engine with characteristics close to ideal. In this sense, BLDC motors with approximately trapezoidal voltages present a flat region around the zero crossing. This flat region generates a nonlinear effect, which brings instability problems to the traditional zero crossing monitoring control strategy.

The North American document U.S. Pat. No. 6,922,027, entitled "Method of controlling an electric motor, a system for controlling an electric motor and an electric motor", published on Mar. 14, 2013, describes a position sensing technique that, by instead of using the zero-crossing, it uses the comparison of the open phase with the other phases. As the other phases will be connected to voltage Vbus or to GND, through a PWM modulation, a parameter (H) used to indirectly obtain the value of the induced voltages in these other phases is also calculated.

The switching between the various positions occurs, so when the following conditions are accomplished:

Switching Position 6→1: Fam≥Fcm−H
Switching Position 1→2: Fcm≤Fbm+H
Switching Position 2→3: Fbm≥Fam−H
Switching Position 3→4: Fam≤Fcm+H
Switching Position 4→5: Fcm≥Fbm−H
Switching Position 5→6: Fbm≤Fam+H where Fam, Fbm, Fcm are, respectively, the moving averages of the voltages in the terminals Fa, Fb, Fc. Moving averages must be carried out at a multiple sampling frequency of the PWM frequency to fully filter the effect of modulation and obtain the average phase voltages.

H is a function of the motor flow constant, which depends on speed and torque (or current) and can be expressed generically as:

$$H = Hcoef \times (rpm + K \times torque)$$

where Hcoef is a parameter proportional to the motor flow constant and K is a torque (or current) adjustment parameter.

This technique presented in the U.S. Pat. No. 6,922,027 is efficient for estimating position in motors with waveform distortion. However, it presents problems when used in conjunction with phase advance.

More specifically, phase advance can lead to entry into a flat region of uncertainty, where for the same phase advance parameter, it is possible to occur variations in the effective phase advance, and thus cause undesirable oscillations in motor speed.

The North American document U.S. Pat. No. 6,512,341 (B2), entitled "Apparatus and method for driving a brushless motor", published on Jan. 28, 2003, describes a position sensing technique that: first detects the occurrence of the freewheel current by comparing the voltage of the non-energized phase with the voltage of the Vbus or with the GND reference; and second, it performs position detection by comparing the voltage of the non-energized phase with a characteristic waveform of the BLDC motor stored in a memory for data storage, after the end of the freewheel current of the first stage.

However, the technique proposed in U.S. Pat. No. 6,512,341 (B2) focuses only on the detection of the freewheel current after a switching, being unable to determine the duration of the freewheel current due to phase advance, as proposed in this patent.

SUMMARY

The purpose of the present invention is to allow the use of phase advance in motors with non-ideal induced voltages, especially in motors with induced voltages that present a flat region, to avoid control instability.

The first step is to detect the passage of tension induced by the flat region of instability. Detection can be done in two ways:

a) Direct measurement of induced voltage; and
b) Measurement of the extinguishing time of the freewheel current.

Both present ways to increase the phase advance, in order to jump a region of nonlinearity of the induced voltage, thus avoiding unwanted effects such as motor instability (oscillations in compressor speed).

BRIEF DESCRIPTION OF DRAWINGS

The objectives and advantages of the present invention will become clearer through the following detailed description of the examples and non-limiting drawings presented at the end of this document.

DETAILED DESCRIPTION

The drawings will be described in detail with reference numbers where possible. The specific examples used throughout the description are used only for clarification purposes and are not intended to limit the applicability of the present invention.

Figure 1A:
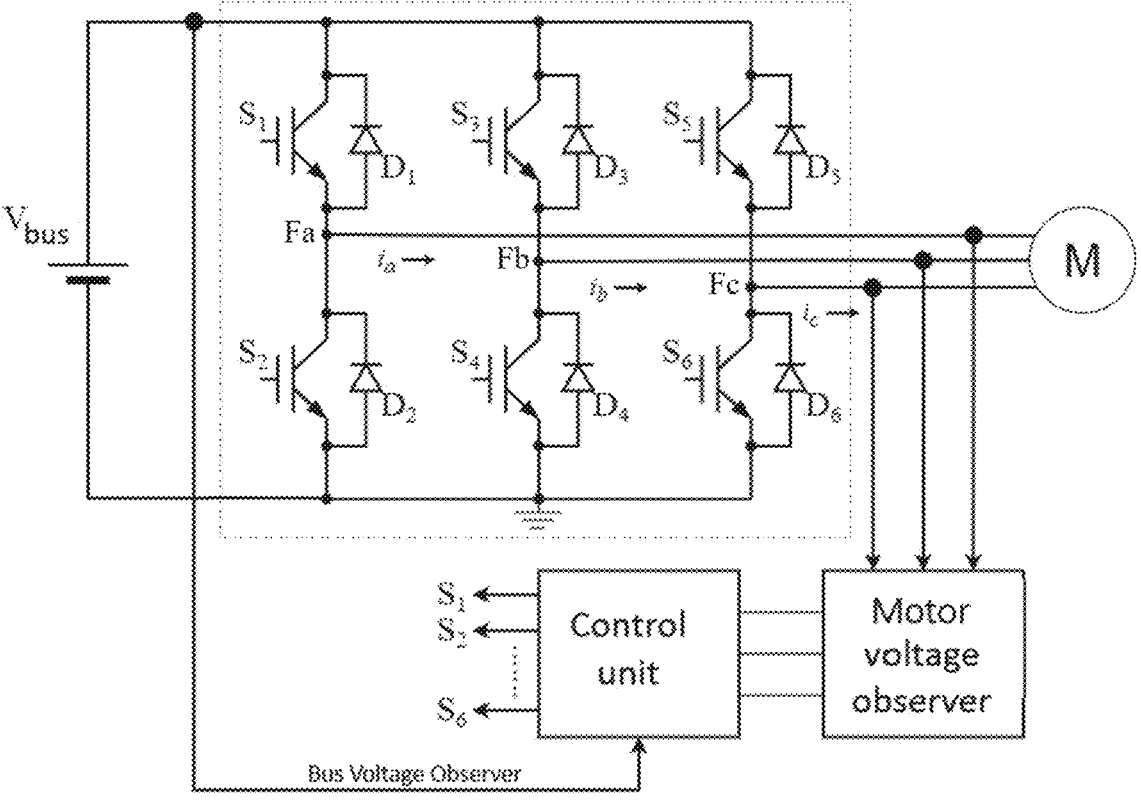
FIG. 1A represents the inverter topology generally used.

FIG. 1A illustrates the inverter topology generally used. The inverter consists of a stage converter at the input, which is responsible for providing a DC voltage source (Vbus).

Connected to the converter output there is an inverter bridge formed by six keys (SW 1,2,3,4,5,6) with six diodes (D1-D6) in parallel with the six keys (SW 1,2,3,4,5,6). This inverter bridge is connected to the BLDC motor.

A control unit is formed by a voltage observer circuit, used to monitor the induced voltages and estimate the electrical angle of the rotor to then apply the various electrical positions of 60 degrees (1,2,3,4,5,6).

The most used rotor angle estimation technique in BLDC motors is to detect zero crossing of the induced voltage in the open phase during each position.

Figure 1B:
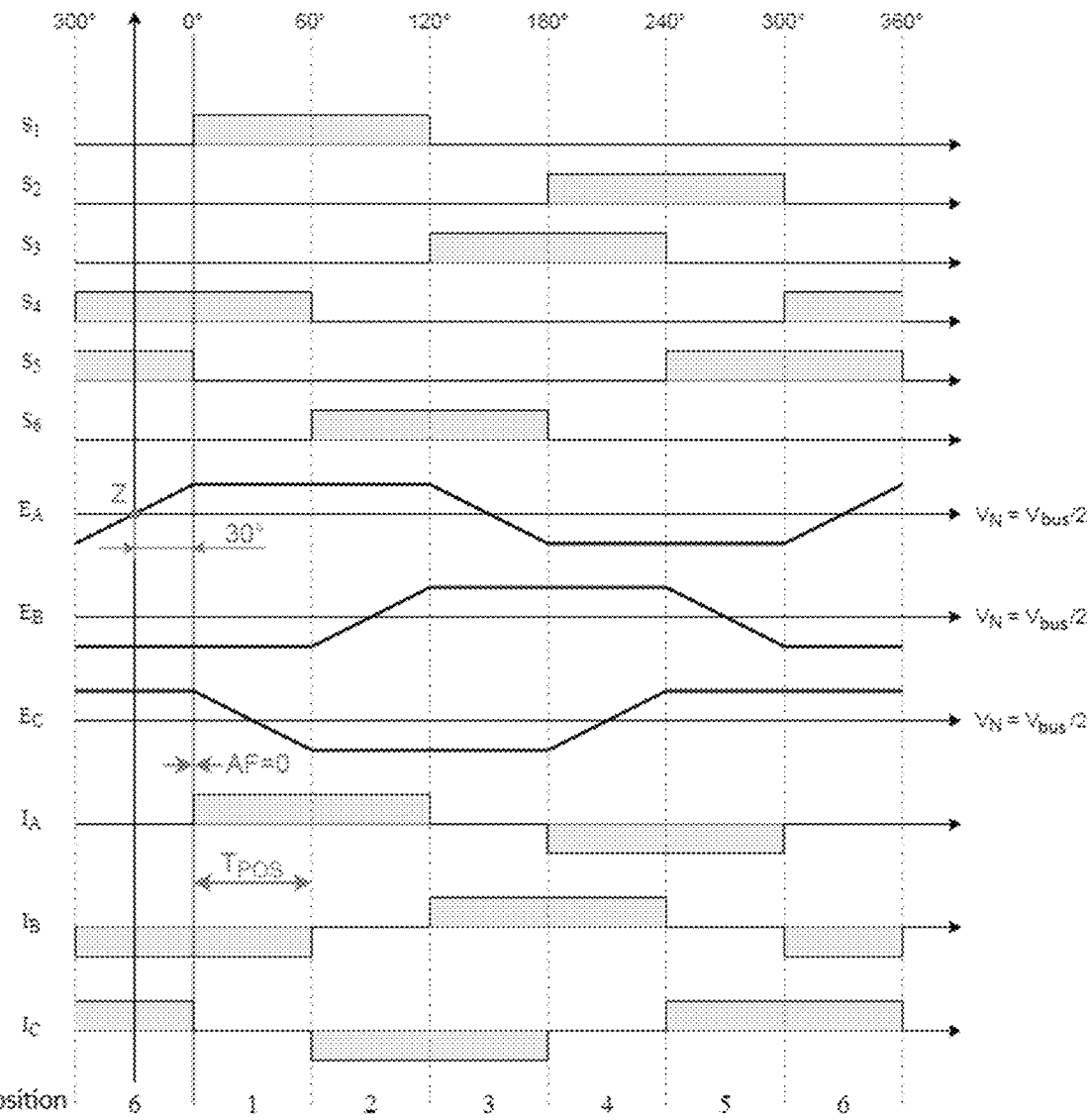
FIG. 1B shows the waveforms of a typical actuation of a BLDC motor.

In FIG. 1B, for example, position 6 is completely open and its induced voltage can be monitored. When this voltage reaches Vbus/2 it is because the zero-crossing (Z) occurred.

This crossing occurs at exactly 30 degrees from the switching point to position 1. Then the time corresponding to 30 degrees is waited based on the previous switches and the switching is made to position 1.

In general, each drive position is phased with induced voltages to ensure maximum torque and power factor. That is, the phase angle (AF) between the applied inverter voltages and the induced motor voltages is approximately null.

In FIG. 1B, for example:

The SW 1, 2 keys are in phase with the ea induced voltage, generating a current Ia also in phase with Ea;

The SW 3, 4 keys are in phase with the Eb induced voltage, generating an Ib current also in phase with Eb;

The SW 5, 6 keys are in phase with the Ec induced voltage, generating an Ic current also in phase with Ec;

However, a more efficient technique for estimating position in motors with waveform distortion is presented in the U.S. Pat. No. 6,922,027 patent document, since position detection occurs far from the flat region. In this position sensing technique, instead of using zero crossing, the comparison of the open phase with the other phases is used with the aid of a parameter (H) used to indirectly obtain the value of the induced voltages in these other phases.

Figure 2A:
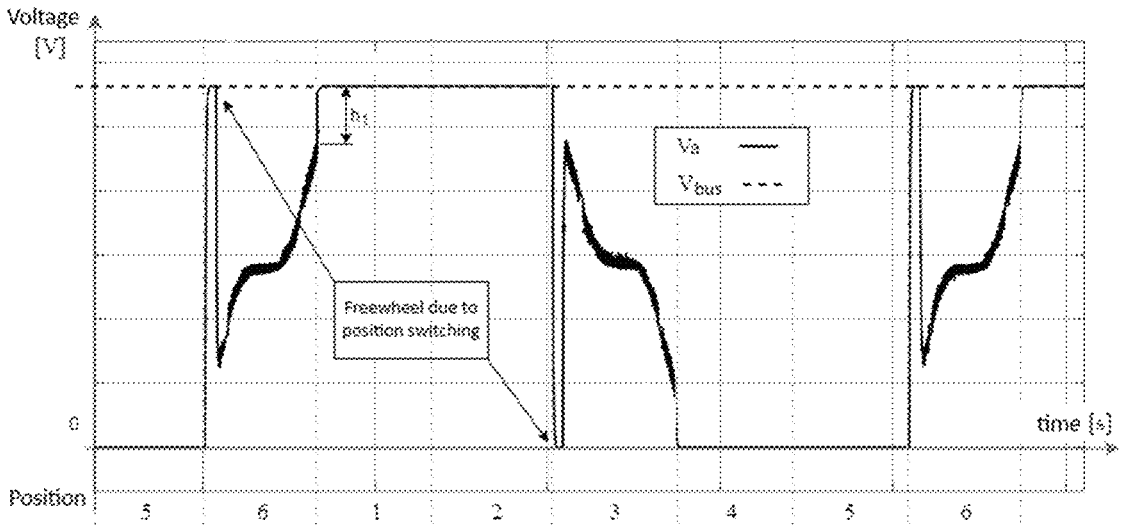
FIGS. 2A to 2D represents the voltage in one of the motor phases and the impacts of the phase advance.

FIG. 2A illustrates the FA tension in relation to the ground (GND) shown in FIG. 1. In this figure it is possible to observe a first level of null phase advance, corresponding to the value of H=h1.

The phase advance technique can be easily associated with this position sensing technique by gradually incrementing the Hcoef parameter. The gradual increase of the Hcoef parameter causes the H parameter to also increase and the position change to be anticipated, providing a gradual phase advance.

An important feature, indicative of the phase advance level, is the emergence of freewheel currents with inverse behavior to that of switching freewheel currents.

It is also observed that after each position switching, freewheel currents occur by the inverter bridge diodes to extinguish the phase current that was disconnected after switching between positions.

For example, in switching from position 5 to position 6, phase A is disconnected as the SW1 and SW2 keys are opened. Thus, the current in phase A continues to circulate through the D1 diode in parallel with the SW1 key until its complete extinction.

During this extinction period the FA terminal is connected to the Vbus as shown in FIG. 2A. In switching from position 2 to position 3, a freewheel current occurs through the D2 diode of the SW2 switch and, therefore, the FA terminal is connected to the GND reference.

Figure 2B:
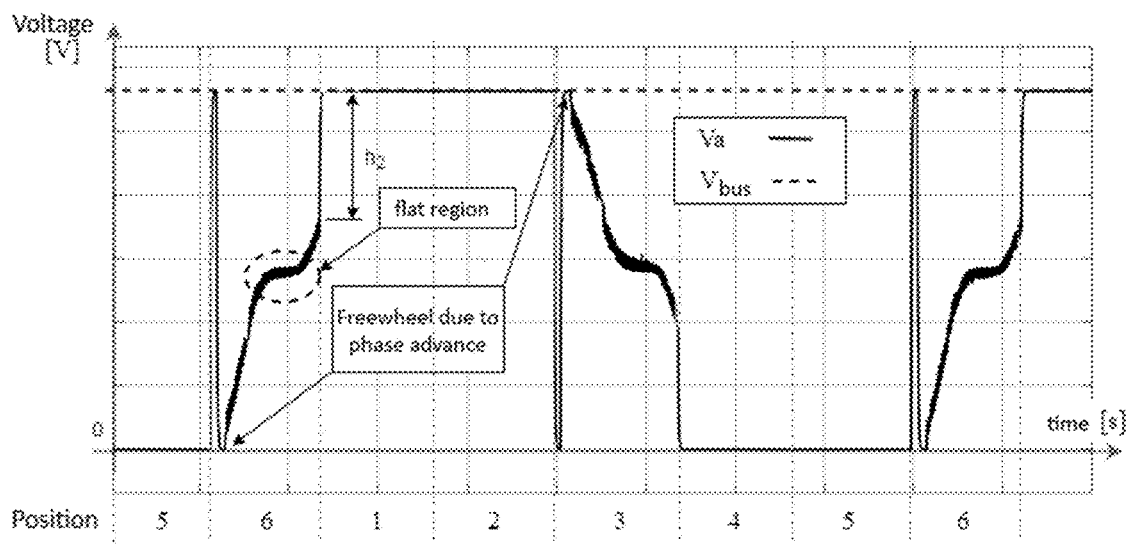

In FIG. 2B, when applying a second phase advance level where H=h2>h1 due to the gradual increase of the Hcoef parameter, it is noticed that the flat region, highlighted in FIG. 2B, is still far from the position change and the phase advance works without major problems, except for the appearance of a second freewheel current, with inverse feature to that of switching freewheel currents.

Furthermore, in relation to FIG. 2B, in position 6, after the extinction of the switching freewheel current, the beginning of the conduction of the D2 diode associated with the SW2 key occurs, causing the FA terminal to be connected to the GND reference.

Similarly, in position 3, after the extinction of the switching freewheel current, the driving of the D1 diode associated with the SW1 switch occurs, causing the FA terminal to be connected to the Vbus.

The higher the phase advance level, the longer the phase advance current duration.

Figure 2C:
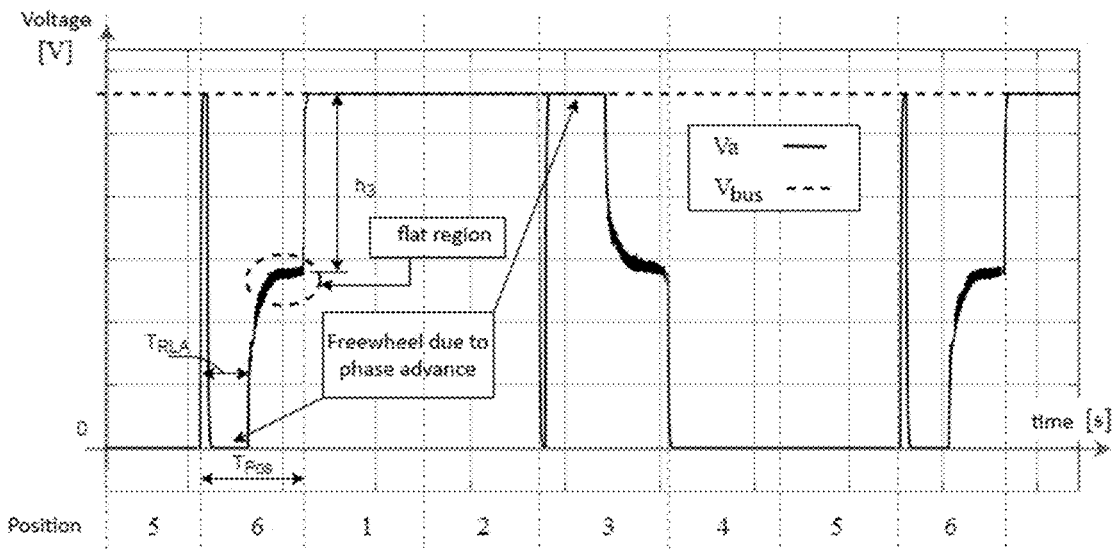

In FIG. 2C, a third phase advance level where H=h3>h2>h1 is reached due to the gradual increase of the Hcoef parameter. With this phase advance level, the level of the flat region of the induced voltage (highlighted in FIG. 2C) was reached.

Now, the duration of phase advance freewheel (T_RLA) currents is much longer, reaching approximately 50% of the permanence time in a position (T_Pos).

Figure 2D:
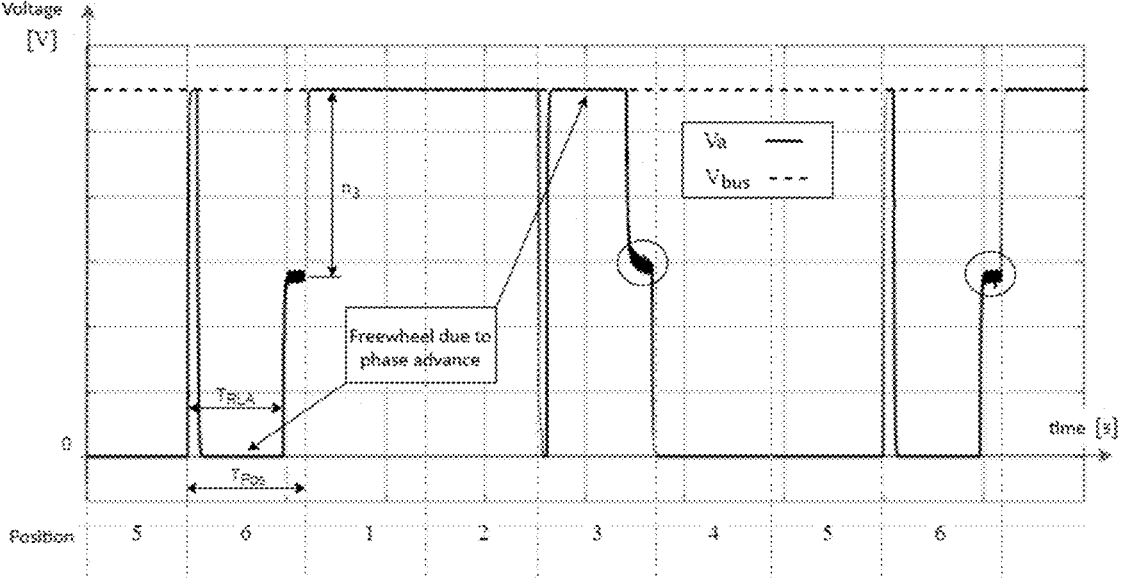

From this point on, it is no longer possible to guarantee a single level of phase advance, since for the same value of H=h3, one can have the phase advance level of FIG. 2C or FIG. 2D, which represents a significantly higher value (in this case, T_RLA>70% of T_Pos).

Due to this uncertainty, the speed control enters a region of instability, and can generate oscillations in the speed of the motor.

Speed control is impaired by two factors resulting from this uncertainty: the variation of the speed calculation derived from the time in each position, and the torque variation applied to the motor due to the variation in the phase-advance freewheel current.

The advance level of FIG. 2D is already close to the maximum advance level, due to the prolonged duration of the phase advance freewheel current (T_RLA), which makes it difficult to monitor the induced voltage.

Thus, the method of detection of instability by direct measurement of induced voltage consists of verifying the proximity of the flat region after each increment of parameter H.

When it is detected that a slightly lower advance level than in FIG. 2C has been reached, a fixed final increment Df is applied in the H_coef coefficient to ensure that the maximum phase advance level is immediately reached, as shown in FIG. 2D. That is, the df increment value should be sufficient to exceed the unwanted flat region.

Figure 3:
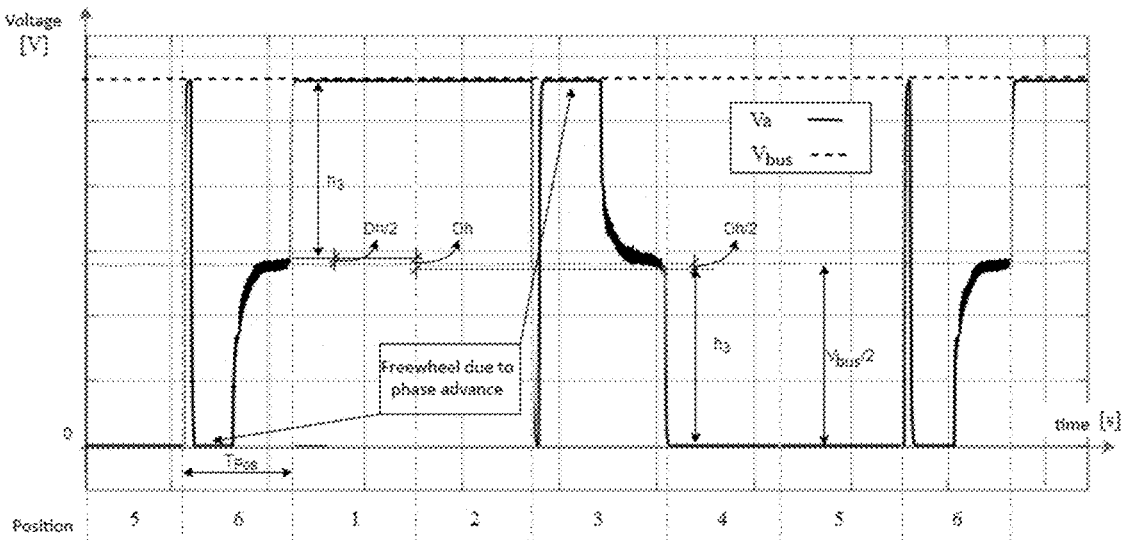
FIG. 3 shows the detection of the flat region by means of direct measurement of induced voltage.

To identify the time to add the final fixed increment Df, that is, to identify that the phase advance entered the flat region, it is enough to verify that the value of the voltage induced at the point of switching is approximately equal to half of the bus voltage (Vbus/2) as illustrated in FIG. 3.

Furthermore, the following comparisons are made to identify the flat region in any of the positions:

Position 1: If Fbm+H≥Vbus/2−Dh/2;
Position 2: If Fam−H≤Vbus/2+Dh/2;
Position 3: If Fcm+H≥Vbus/2−Dh/2;
Position 4: If Fbm−H≤Vbus/2+Dh/2;
Position 5: If Fam+H≥Vbus/2−Dh/2;
Position 6: If Fcm−H≤Vbus/2+Dh/2;

where Dh characterizes the flat region range of induced voltage that one wishes to avoid.

Thus, when the induced voltage at the switching point is approximately equal to half the bus voltage (Vbus/2) minus the Dh tolerance band, then:

$$H\_coef=H\_coef+Df$$

Before performing the Df increment it is important to record the current rotational speed value (Sa) and after the Df increment, the rotational speed value obtained Sd is also recorded to verify the rotational speed increment:

$$DS=Sd−Sa$$

This rotational speed increment is indicative of the phase advance level obtained and is used to identify the moment of removing the Df increment and leaving the flat region.

That is, if it is desirable to reduce rotational speed, it is necessary to verify that the desired rotational speed is less than the current rotational speed subtracted from the DS value, to ensure that it is possible to reduce the phase advance level to a level that is outside the flat region.

Thus, the detection of the passage through the flat region of instability through the direct measurement of the induced voltage is made from the following steps:

applying a gradual phase advance through the gradual increase of the Hcoef parameter, for example;

monitoring the Vbus voltage and the voltages of the FA, FB and FC phases in the positions where the respective phases are opened;

checking, at each of the phase advance levels, whether the induced voltage value at each of the motor positions (1 to 6) at the time of position change is approximately equal to half of the bus voltage (Vbus/2), wherein if the induced voltage corresponds approximately to half of Vbus, a fixed Df increment is applied to the H_coef parameter.

Furthermore, it is possible to detect the phase advance contained in a flat region from the measurement of the freewheel current extinction time.

In this embodiment, the extinction time of the phase advance freewheel current (T_RLA) is carried out as the phase advance is increased.

When an abrupt increase in freewheel current time is detected, the flat region of the induced voltage has been reached and a df fixed increment factor is added to the value of the H_coef.

Figure 4A:
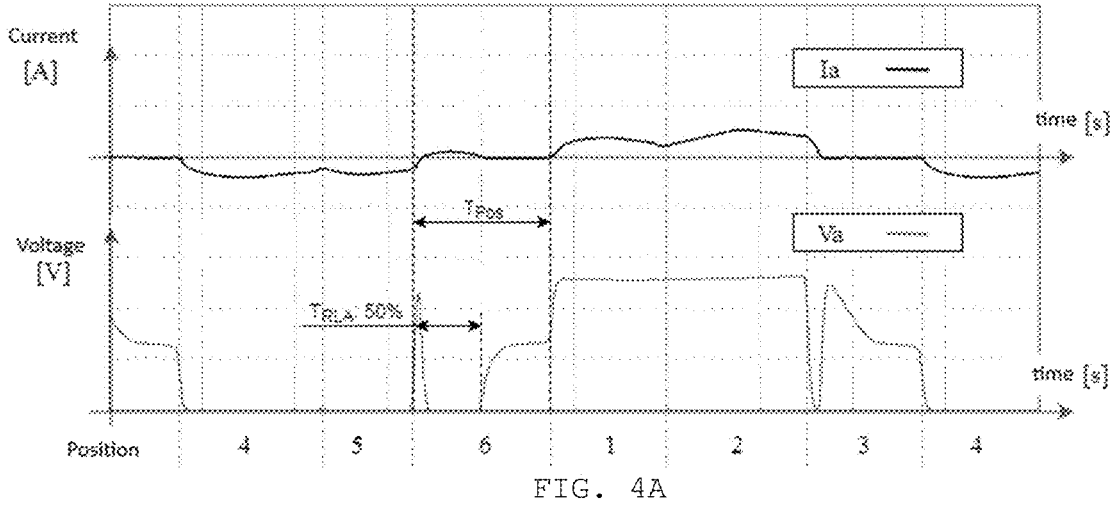
FIGS. 4A and 4B present the detection of the flat region by indirect measurement of the duration of the freewheel current by reading the phase voltage.

In FIG. 4A, the phase advance was continuously increased until the flat region of the induced voltage was reached, in which initially the extinction time value of the freewheel current was approximately T_RLA=50% of the time of permanence in a position (T_POS).

Figure 4B:
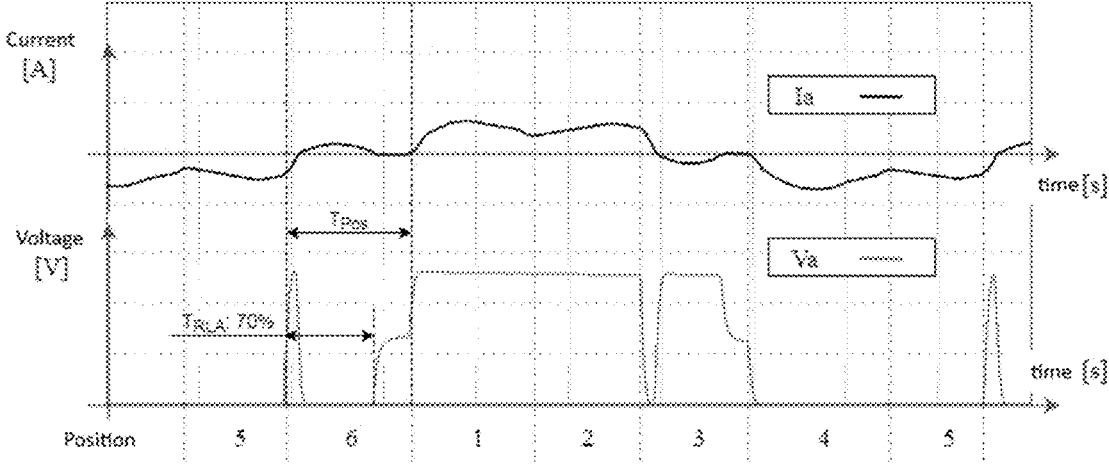

Then, the value of T_RLA increased to approximately 70%, as shown in FIG. 4B. This fact confirms that the flat region has been achieved. With this, the df fixed increment factor is added to the parameter H_coef avoid the inherent instability of this region.

Simply put, the method consists of gradually increasing the phase advance by increasing the H_coef parameter and, by detecting that the T_RLA value has exceeded an upper limit, T_RLA_S, for example 50% of the time value in the position (T_POS), means that the flat region has been reached and the fixed df value must be added to parameter H, to avoid the flat region.

Thus, the detection of the passage through the flat region of instability by measuring the extinction time of the freewheel current comprises the steps of:

applying a gradual phase advance through, for example, the gradual increase of the Hcoef parameter;

monitoring the Vbus voltage and the voltages of the FA, FB and FC phases in the positions where the respective phases are opened;

measure the extinction time of the freewheel current at each phase advance level by comparing the voltage of the open phase with the voltage of the Vbus or the GND reference according to its position;

the extinguishing time of the freewheel current being composed of switching freewheel current and phase advance freewheel current; and if the extinction time of the freewheel currents is greater than a predetermined maximum value, apply a fixed Df increment to the H parameter.

Although the present invention has been described in relation to certain preferred embodiments, it must be understood that it is not intended to limit the invention to these particular embodiments. On the contrary, it is intended to cover all possible alternatives, modifications and equivalences within the spirit and scope of the invention, as defined by the attached claims.

The invention claimed is:

1. A phase advance method for allowing a use of phase advance, including monitoring of a rotor position, in at least one sensorless brushless direct current (BLDC) motor with non-trapezoidal or non-ideal induced voltages, the induced voltages being proximate a zero crossing point and characterized by a substantially flat region around the zero crossing point, the at least one sensorless BLDC motor being driven with a six-step drive mode and comprising a rotor, wherein the at least one sensorless BLDC motor is configured to permit detection of at least one passage of the induced voltages through the substantially flat region proximate the zero crossing point by direct measurement of the induced voltages, wherein the flat region proximate the zero crossing point that generates a nonlinear effect, the method comprising:

applying a gradual phase advance by advancing a commutation angle of a voltage applied to the at least one sensorless BLDC motor with a gradual phase advance level in relation to the rotor position;

monitoring, subsequent to applying the gradual phase advance, a bus voltage (Vbus) provided by a DC voltage source of an inverter connected to the motor; and monitoring voltages of phases of the motor, wherein the phases comprise FA, FB, FC phases;

comparing an open phase corresponding to one of the phases that is open in one of a plurality of rotor positions including the rotor position with other phases different from the open phase of the phases using a parameter (H) that is calculated by $H=H_{coef}\times(rpm+k\times torque)$, with rpm being rotational speed, $H_{coef}$ being a parameter proportional to a motor flux constant, associated with a characteristic of the motor, and k being a torque (or current) adjustment parameter; and checking, at each of a plurality of phase advance levels, whether a value of the induced voltages at the plurality of rotor positions, including a first position, a second position, a third position, a fourth position, a fifth position, and a sixth position, is approximately equal to half of the bus voltage (Vbus/2) indicative of the motor reaching the substantially flat region proximate the zero crossing point, wherein when the value corresponds to approximately half of Vbus, a fixed Df increment is applied to the Hcoef parameter.

2. A phase advance method for allowing a use of phase advance, including monitoring of a rotor position, in at least one sensorless brushless direct current (BLDC) motor with non-trapezoidal or non-ideal induced voltages, the induced voltages being proximate a zero crossing point and characterized by a substantially flat region around the zero crossing point, the at least one sensorless BLDC motor being driven with a six-step drive mode and comprising a rotor, wherein the at least one sensorless BLDC motor is configured to permit detection with the induced voltages of at least one passage of the induced voltages through the substantially flat region proximate the zero crossing point, by measuring an extinction time of a freewheel current, wherein the flat region proximate the zero crossing point that generates a nonlinear effect, the method comprising:

applying a gradual phase advance by advancing a commutation angle of a voltage applied to the motor with a gradual phase advance level in relation to the rotor position;

monitoring, subsequent to applying the gradual phase advance, a bus voltage (Vbus) provided by a DC voltage source of an inverter connected to the motor; and monitoring voltages of phases of the motor, wherein the phases comprise FA, FB, and FC phases;

comparing an open phase corresponding to one of the phases that is open in one of a plurality of rotor positions including the rotor position with other phases different from the open phase of the phases using a parameter (H) that is calculated by $H=H_{coef}\times(rpm+k\times torque)$, with rpm being rotational speed, $H_{coef}$ being a parameter proportional to a motor flux constant, associated with a characteristic of the motor, and k being a torque (or current) adjustment parameter;

measuring the extinction time of the freewheel current at each phase advance level by comparing the voltage of the open phase with the Vbus or a ground (GND) reference according to the rotor position, the extinction time of the freewheel current being composed of a switching freewheel current and a phase-advancing freewheel current; and when the extinction time of the freewheel current is longer than a predetermined maximum value, applying a fixed Df increment to the parameter H.

3. The phase advance method according to claim 1, comprising:

recording a current rotational speed value (Sa) of the motor before applying the fixed Df increment;

recording a subsequent rotational speed value (Sd) after applying the fixed Df increment; and obtaining a rotational speed increment value (DS) wherein: DS=Sd−Sa.

\* \* \* \* \*